United States Patent [19]

Derible et al.

[11] 3,904,586

[45] Sept. 9, 1975

[54] NOVEL BENZYLOXYSULFAMIDES

[75] Inventors: Pierre Henri Derible, Le Perreux; Daniel Humbert, Paris; Claude Dumont, Nogent-sur-Marne, all of France

[73] Assignee: Roussel-UCLAF, Paris, France

[22] Filed: July 10, 1974

[21] Appl. No.: 487,036

[30] Foreign Application Priority Data
July 13, 1973  France ............... 73.25759

[52] U.S. Cl. .................. 260/556 N; 424/321
[51] Int. Cl.² ...................... C07C 143/80
[58] Field of Search ................. 260/556 N

[56] References Cited
UNITED STATES PATENTS
3,509,211   4/1970   Ilvespaa et al. ............... 260/556 N
3,634,507   1/1972   Boissier et al. ............... 260/556 N FOREIGN PATENTS OR APPLICATIONS
6,500,481   7/1965   Netherlands ................ 260/556 N
3,917M      3/1966   France ........................ 260/556 N
6,500,542   7/1965   Netherlands ................ 260/556 N

*Primary Examiner*—Allen B. Curtis
*Assistant Examiner*—Thomas A. Waltz
*Attorney, Agent, or Firm*—Hammond & Littell

[57]         ABSTRACT

Novel benzyloxysulfamides of the formula

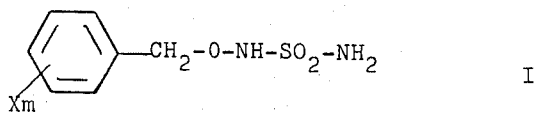

wherein X is a halogen and m is 0, 1, 2 or 3 and their non-toxic, pharmaceutically acceptable alkaline salts having tranquillizing, anticonvulsant and anxiolytic properties and their preparation.

12 Claims, No Drawings

NOVEL BENZYLOXYSULFAMIDES

STATE OF THE ART

French Pat. No. 1,586,875 describes among other compounds phenyloxyalkylsulfamides having myorelaxant activity but does not teach the compounds of formula I.

OBJECTS OF THE INVENTION

It is an object of the invention to provide the novel benzyloxysulfamides of formula I and their non-toxic, pharmaceutically acceptable alkaline salts.

It is another object of the invention to provide a novel process for the preparation of the compound of formula I.

It is a further object of the invention to provide novel therapeutic compositions having central nervous system depressant activity and anticonvulsant activity and to a novel method of administering said compositions to warm-blooded animals.

These and other objects and advantages of the invention will become obvious from the following detailed description.

THE INVENTION

The novel benzyloxysulfamides of the invention are selected from the group consisting of compounds of the formula

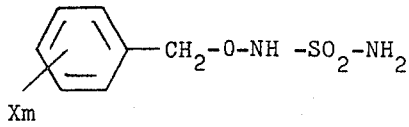

wherein X is a halogen and m is 0, 1, 2 or 3 and their nontoxic, pharmaceutically acceptable alkali metal salts. X is preferably fluorine, chlorine or bromine and the alkali metal salts are preferably sodium, potassium or lithium.

Among the most preferred compounds, when m is 1, X is chlorine, bromine or fluorine and when m is 0 or 2, X is chlorine and their alkali metal salts. Specific compounds of formula I are benzyloxysulfamide, 2-fluorobenzyloxysulfamide, 3-fluorobenzyloxysulfamide, 4-fluorobenzyloxysulfamide, 2-chloro-benzyloxysulfamide, 3-chlorobenzyloxysulfamide, 4-chlorobenzyloxysulfamide, 2,4-dichlorobenzyloxysulfamide and 4-bromobenzyloxysulfamide.

The novel process of the invention for the preparation of the compounds of formula I comprises reacting sulfamide, $H_2N-SO_2-NH_2$, with a benzyloxyamine of the formula

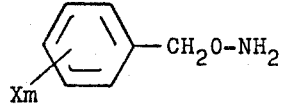

where X and m have the above definitions to obtain the corresponding compound of formula I which may then be reacted with an alkali metal hydroxide to form the desired alkali metal salt thereof.

In a preferred mode of the process, 2 moles of sulfamide are reacted with 1 mole of a benzyloxyamine of formula II with or without solvent at a temperature from room temperature to reflux temperature.

It is advantageous to operate with at least one solvent such as aqueous ethanol or in the presence of anhydrous pyridine at reflux temperatures, using at first in the reaction equimolar quantities of sulfamide and benzyloxyamine of formula II, then after heating for a time adding another quantity of sulfamide equal to the first addition followed by heating until completion of the reaction. The reaction mixture is then diluted by addition of water and is extracted with a solvent. The extracts may then be washed with N hydrochloric acid and then water, dried to remove water and concentrated to isolate the desired product of formula I.

The alkali metal salts of the sulfamides of formula I can be easily formed by reacting substantially stoichiometric amounts of an alkali metal hydroxide and the benzyloxysulfamide in the presence of a solvent such as water or low molecular weight aliphatic alcohols and recovering the salt formed. Examples of suitable alkali metal hydroxides are sodium hydroxide and potassium hydroxide.

The benzyloxyamines of formula II may be made by reacting benzyl halide of the formula

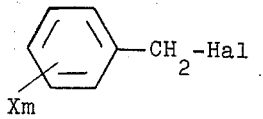

where X and m have the above definition and Hal is chlorine or bromine with N-hydroxy-phthalimide in the presence of a solvent and potassium hydroxide to form a compound of the formula

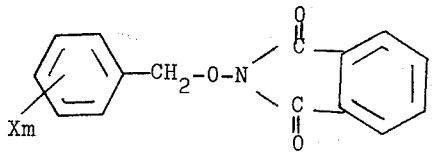

and reacting the latter with hydrazine to obtain the corresponding benzyloxyamine of formula II.

The novel therapeutic compositions of the invention are comprised of an effective amount of at least one compound of formula I and its alkali metal salts and a pharmaceutical carrier. The compositions may be in the form of tablets, coated tablets, dragees, gelules, granules, suppositories and injectable solutions or suspensions prepared in the usual fashion.

The active compounds may be incorporated into the usual excipients used in pharmaceuticals such as talc, arabic gum, lactose, amidon, magnesium stearate, cacao butter, aqueous or non-aqueous vehicles, fatty bodies of animal or vegetable origin, paraffinic derivatives, glycols, various wetting agents, dispersants or emulsifiers and preservatives.

The therapeutic compositions of the invention possess tranquillizing, anticonvulsant and anxiolytic properties and therefore are useful for the treatment of anxiety, hyperemotivity, psychomotric agitation, irritability that accompanies sleeping troubles and excitation states.

The novel method of the invention for preventing anxiety and convulsions and inducing tranquility in warm-blooded animals comprises administering to warm-blooded animals an effective amount of at least one compound of formula I and its alkali metal salts. The products may be administered parenterally, orally or rectally and the usual effective daily dose is 0.5 to 8 mg/Kg depending upon the product and the method of administration.

In the following examples there are described several preferred embodiments to illustrate the invention. However, it is to be understood that the invention is not intended to be limited to the specific embodiments.

EXAMPLE 1

Benzyloxysulfamide

A mixture of 24.6 g of benzyloxyamine, 40 g of sulfamide, 80 ml of water and 40 ml of ethanol was refluxed with stirring for 16 hours and after cooling, another 40 g of sulfamide were added to the mixture. The mixture was refluxed for 12 hours, then cooled and poured into water. The oil formed was extracted with ether and the ether extracts were washed with N hydrochloric acid, then with water and dried. The solvent was removed and the residue was crystallized from isopropyl oxide to obtain 6.3 g of benzyloxysulfamide in the form of white crystals melting at 74°C.

Analysis: $C_7H_{10}N_2O_3S$; molecular weight = 202.24

| | %C 41.57 | %H 4.98 | %N 13.85 | %S 15.86 |
|---|---|---|---|---|
| Calculated: | %C 41.57 | %H 4.98 | %N 13.85 | %S 15.86 |
| Found: | 41.6 | 5.0 | 14 | 15.9 |

EXAMPLE 2

2-fluorobenzyloxysulfamide

STEP A: N-(2-fluorobenzyloxy)-phthalimide

A solution of 12.6 g of potassium hydroxide in 60 ml of methanol was added dropwise with stirring to a mixture of 29.5 g of 2-fluorobenzyl chloride, 33.5 g of N-hydroxyphthalimide and 350 ml of dimethylformamide and during the course of the addition, the temperature of the mixture rose to 80°C. After the addition of the methanolic solution, the mixture was stirred with heating for 15 minutes and after cooling, the mixture was poured into 700 ml of ice water. The precipitate formed was recovered by vacuum filtration, was washed with water and dried under reduced pressure. The product was crystallized from benzene to obtain 36 g of N-(2-fluorobenzyloxy)-phthalimide in the form of white crystals melting at 155°C.

Analysis: $C_{15}H_{10}FNO_3$; molecular weight = 271.25

| | %C 66.42 | %H 3.72 | %N 5.15 | %F 7.00 |
|---|---|---|---|---|
| Calculated: | %C 66.42 | %H 3.72 | %N 5.15 | %F 7.00 |
| Found: | 66.6 | 3.8 | 5.5 | 7.0 |

STEP B: 2-fluorobenzyloxyamine

A mixture of 36 g of N-(2-fluorobenzyloxy)-phthalimide, 300 ml of ethanol and 7.3 g of hydrazine hydrate was refluxed with stirring for 1 hour and the mixture was then cooled and vacuum filtered. The precipitate was washed with alcohol and the filtrate was acidified with N hydrochloric acid and evaporated to dryness under reduced pressure. The residue was taken up in water and the aqueous phase was washed with ether and made alkaline with sodium hydroxide. The oil formed was extracted with ether and the organic phase was washed with water, dried and evaporated to dryness. The oily residue was distilled to obtain 15.5 g of 2-fluorobenzyloxyamine in the form of a colorless liquid with a boiling point of 50°–55°C at 0.01 mm Hg.

Analysis: $C_7H_8FNO$; molecular weight = 141.15

| | %C 59.57 | %H 5.71 | %N 9.92 | %F 13.46 |
|---|---|---|---|---|
| Calculated: | %C 59.57 | %H 5.71 | %N 9.92 | %F 13.46 |
| Found: | 61.0 | 5.9 | 10.0 | 13.6 |

STEP C: 2-fluorobenzyloxysulfamide

A mixture of 15 g of 2-fluorobenzyloxyamine, 20 g of sulfamide and 50 ml of anhydrous pyridine was refluxed for 45 mixtures and then was cooled and poured into a mixture of 150 ml of N hydrochloric acid and ice. The oil formed was extracted with ether and the ether phase was washed with water, dried and evaporated to dryness. The residue was crystallized from 50 ml of benzene to obtain 11.5 g of 2-fluorobenzyloxysulfamide in the form of white crystals melting at 80°C.

Analysis: $C_7H_9FN_2O_3S$; molecular weight = 220.24

| | %C 38.18 | %H 4.12 | %N 12.72 | %F 8.63 | %S 14.56 |
|---|---|---|---|---|---|
| Calculated: | %C 38.18 | %H 4.12 | %N 12.72 | %F 8.63 | %S 14.56 |
| Found: | 38.1 | 4.3 | 12.5 | 8.7 | 14.3 |

EXAMPLE 3

3-fluorobenzyloxysulfamide

STEP A: N-(3-fluorobenzyloxy)-phthalimide

A solution of 13 g of potassium hydroxide in 60 ml of methanol was added dropwise with stirring to a mixture of 30.5 g of 3-fluorobenzyl chloride, 34.5 g of N-hydroxyphthalimide and 350 ml of dimethylformamide and during the addition, the temperature rose to 80°C. The mixture was held at 80°C for 30 minutes and was then cooled and poured into a liter of ice water. The precipitate formed was recovered by vacuum filtration, was dried under reduced pressure and crystallized from isopropanol to obtain 39.5 g of N-(3-fluorobenzyloxy)-phthalimide in the form of white crystals melting at 134°C.

Analysis: $C_{15}H_{10}FNO_3$; molecular weight = 271.25

| | %C 66.42 | %H 3.72 | %N 5.16 | %F 7.00 |
|---|---|---|---|---|
| Calculated: | %C 66.42 | %H 3.72 | %N 5.16 | %F 7.00 |
| Found: | 66.3 | 3.8 | 5.2 | 7.2 |

STEP B: 3-fluorobenzyloxyamine

A solution of 8.1 g of hydrazine hydrate in 50 ml of ethanol was added dropwise with stirring to a mixture of 39 g of N-(3-fluorobenzyloxy)-phthalimide in 300 ml of ethanol and the mixture was refluxed for 2 hours, was cooled and vacuum filtered. The filtrate was evaporated to dryness under reduced pressure and the residue was taken up in 200 ml of N hydrochloric. acid. The acid phase was washed with ether and made alkaline with 2N sodium hydroxide solution. The oil formed was extracted with ether and the organic phase was washed with water, dried over magnesium sulfate and evaporated to dryness under reduced pressure to obtain 9 g of 3-fluorobenzyloxyamine with a boiling point of 88°C at 10 mm Hg which was used as is.

STEP C: 3-fluorobenzyloxysulfamide

A mixture of 4 g of 3-fluorobenzyloxyamine, 5.45 g of sulfamide and 30 ml of pyridine was refluxed for 1 hour and after cooling, the mixture was poured into a mixture of ice and hydrochloric acid. The oily product formed was extracted with methylene chloride and the organic extracts were washed with water, dried over magnesium sulfate and evaporated to dryness under reduced pressure. The solid residue was crystallized from benzene to obtain 1.4 g of 3-fluorobenzyloxysulfamide in the form of a white solid melting at 86°C.

Analysis: $C_7H_9FN_2O_3S$; molecular weight = 220.4

| | %C 38.18 | %H 4.12 | %N 12.72 | %F 8.63 | %S 14.56 |
|---|---|---|---|---|---|
| Calculated: | 38.4 | 4.1 | 12.4 | 8.9 | 14.6 |
| Found: | | | | | |

EXAMPLE 4

4-fluorobenzyloxysulfamide

A mixture of 18 g of 4-fluorobenzyloxyamine, 25 g of sulfamide, 60 ml of water and 30 ml of ethanol was refluxed with stirring for 15 hours and after cooling, another 25 g of sulfamide were added. The mixture was refluxed for 10 hours and was cooled and poured into water. The oil formed was extracted with ether and the ether phase was washed with N hydrochloric acid, then water. The extract was dried and evaporated to dryness under reduced pressure. The residue was crystallized twice from 40 ml of isopropyl oxide to obtain 5.9 g of 4-fluorobenzyloxysulfamide in the form of a white solid melting at 81°C.

Analysis: $C_7H_9FN_2O_3S$; molecular weight = 220.27

| | %C 38.18 | %H 4.12 | %N 12.74 | %F 8.63 | %S 14.56 |
|---|---|---|---|---|---|
| Calculated: | 38.4 | 4.2 | 12.5 | 8.9 | 14.5 |
| Found: | | | | | |

EXAMPLE 5

2-chlorobenzyloxysulfamide

A mixture of 11.6 g of 2-chlorobenzyloxyamine, 26.7 g of sulfamide, 50 ml of ethanol and 50 ml of water was refluxed for 24 hours and after cooling, the mixture was poured into water. The oil formed was extracted with ether and the ether phase was washed with 2N hydrochloric acid and then with water. The ether was dried and evaporated to dryness under reduced pressure. The residue was crystallized from isopropyl ether to obtain 4.2 g of 2-chlorobenzyloxysulfamide in the form of a white solid melting at 112°C.

Analysis: $C_7H_9ClN_2O_3S$; molecular weight = 236.69

| | %C 35.52 | %H 3.82 | %N 11.44 | %S 13.55 | %Cl 14.98 |
|---|---|---|---|---|---|
| Calculated: | 35.33 | 4.06 | 11.74 | 13.55 | 14.82 |
| Found: | | | | | |

EXAMPLE 6

3-chlorobenzyloxysulfamide

A mixture of 15.76 g of 3-chlorobenzyloxyamine, 19.2 g of sulfamide, 40 ml of water and 20 ml of ethanol was refluxed for 8 hours and after cooling, the mixture was poured into water. The reaction mixture was extracted with ether and the ether phase was washed with 0.5 N hydrochloric acid and then water. The extracts were dried and evaporated to dryness. The residue was crystallized from benzene to obtain 7.2 g of 3-chlorobenzyloxysulfamide in the form of white crystals melting at 130°C.

Analysis: $C_7H_9ClN_2O_3S$; molecular weight = 236.69

| | %C 35.52 | %H 3.83 | %N 11.84 | %S 13.65 | %Cl 14.98 |
|---|---|---|---|---|---|
| Calculated: | 35.65 | 3.98 | 11.81 | 13.53 | 14.90 |
| Found: | | | | | |

EXAMPLE 7

4-chlorobenzyloxysulfamide

A mixture of 47.2 g of 4-chlorobenzyloxyamine, 57.5 g of sulfamide, 60 ml of ethanol and 120 ml of water was refluxed for 7 hours and after another 57.5 g of sulfamide were added, the mixture was refluxed for 15 hours. The cooled mixture was poured into water and the oil formed was extracted with ether. The ether phase was washed with dilute hydrochloric acid, then with water, was dried and evaporated to dryness. The residue crystallized from toluene to obtain 27 g of 4-chlorobenzyloxysulfamide in the form of a white solid melting at 124°C.

Analysis: $C_7H_8ClN_2O_3S$; molecular weight = 236.69

| | %C | %H | %N | %S | %Cl |
|---|---|---|---|---|---|
| Calculated: | 35.52 | 3.83 | 11.84 | 13.55 | 14.98 |
| Found: | 35.63 | 4.02 | 11.98 | 13.50 | 14.97 |

EXAMPLE 8

2,4-dichlorobenzyloxysulfamide

A mixture of 19.2 g of 2,4-dichlorobenzyloxyamine, 19.22 g of sulfamide and 80 ml of anhydrous pyridine was refluxed for 30 minutes and after cooling to room temperature, the mixture was poured into a mixture of 600 g of crushed ice and 100 ml of concentrated hydrochloric acid. The resulting precipitate was recovered by vacuum filtration and was washed with water and dried under reduced pressure to obtain 19.2 g of product. The latter was crystallized from toluene and dissolved in 900 ml of refluxing isopropyl ether. The solution was filtered and the volume was reduced to 100 ml under reduced pressure. The crystals were recovered by vacuum filtration, were washed with isopropyl ether and dried under reduced pressure to obtain 8.6 g of 2,4-dichlorobenzyloxysulfamide in the form of colorless crystals melting at 132°C.

Analysis: $C_7H_8Cl_2N_2O_3S$; molecular weight = 271.12

| | %C | %H | %Cl | %S | %N |
|---|---|---|---|---|---|
| Calculated: | 31.0 | 3.0 | 26.15 | 11.8 | 10.3 |
| Found: | 31.2 | 3.0 | 26.3 | 11.5 | 10.4 |

EXAMPLE 9

4-bromobenzyloxysulfamide

STEP A: 4-bromobenzyloxyphthalimide

A solution of 6.25 g of sodium hydroxide in 26 ml of methanol were added at room temperature dropwise with stirring to a mixture of 25 g of 4-bromobenzyl bromide, 16.3 g of N-hydroxy-phthalimide and 175 ml of dimethylformamide and after stirring at 30°C for 1 hour, the mixture was heated at 80°C for 10 minutes. After cooling, the mixture was poured into 400 g of an ice-water mixture and was vacuum filtered. The precipitate recovered was washed with water and dried under vacuum to obtain 28 g of 4-bromobenzyloxyphthalimide in the form of colorless crystals melting at 136°C. A sample for analysis was crystallized from acetonitrile.

Analysis: $C_{15}H_{10}BrNO_3$; molecular weight = 332.2

| | %C | %H | %Br | %N |
|---|---|---|---|---|
| Calculated: | 54.2 | 3.0 | 24.05 | 4.2 |
| Found: | 53.9 | 3.1 | 23.9 | 4.5 |

STEP B: 4-bromobenzyloxyamine

A solution of 4.4 g of hydrazine hydrate in 10 ml of ethanol was added dropwise at room temperature to a mixture of 27.1 g of 4-bromobenzyloxyphthalimide in 190 ml of ethanol and the mixture was refluxed for 1 hour and cooled to room temperature. The mixture was vacuum filtered and the precipitate was washed with ethanol. The filtrate was neutralized with 2N hydrochloric acid and 100 ml of water were added. The ethanol was removed under reduced pressure and 10 ml of sodium hydroxide were added. The mixture was decanted and the inferior phase was set aside. The aqueous residue was extracted with ether and the combined ether phase and the inferior phase were dried and distilled to dryness to obtain 15.5 g of 4-bromobenzyloxyamine in the form of a colorless liquid boiling at 104°–105°C at 0.2 mm Hg.

Analysis: $C_7H_8BrNO$; molecular weight = 202.0

| | %C | %H | %N | %Br |
|---|---|---|---|---|
| Calculated: | 41.6 | 3.99 | 6.9 | 39.5 |
| Found: | 41.5 | 4.2 | 7.2 | 39.8 |

STEP C: 4-bromobenzyloxysulfamide

A mixture of 13.1 g of 4-bromobenzyloxyamine, 12.45 g of sulfamide and 50 ml of anhydrous pyridine was refluxed for 30 minutes and was poured into a mixture of 400 g of ice and 70 ml of concentrated hydrochloric acid. The precipitate formed was recovered by vacuum filtration, was washed with water and dried under reduced pressure to obtain 13.4 g of product. The latter was crystallized from toluene and 5.3 g of the resulting product was dissolved in 600 ml of isopropyl ether. The solution was filtered and reduced to a volume of 50 ml under reduced pressure. The precipitate formed was recovered by vacuum filtration, was washed with isopropyl ether and dried under reduced pressure to obtain 3.68 g of 4-bromobenzyloxysulfamide in the form of colorless crystals melting at 130°C.

Analysis: $C_7H_9BrN_2O_3S$; molecular weight = 281.13

| | %C | %H | %Br | %N | %S |
|---|---|---|---|---|---|
| Calculated: | 29.9 | 3.2 | 28.4 | 9.9 | 11.4 |
| Found: | 30.3 | 3.1 | 27.6 | 10. | 11.1 |

PHARMACOLOGICAL STUDY

A. Central Nervous System Depressant Activity a. Traction Test

In this test, mice were suspended by their front paws from a metal wire stretched horizontally and in a time of less than 5 seconds, a normal animal effected a reestablishment indicated by raising at least one rear paw to the wire. The test was conducted 25 minutes after the intraperitoneal administration of the test compound and the 50 percent efficiency dose ($DE_{50}$) in mg/kg was determined which is the dose which prevent 50 percent of the animals from effecting a reestablishment in less than 5 seconds.

b. Chimney Test

This test consists of placing a mouse at one end of a glass tube 30 cm long, said tube having a diameter adapted to the size of the animal. The tube is arranged vertically in a rapid manner, the animal with its head on the bottom will normally go up in the tube in less than 30 seconds. The test was effected 25 minutes after the intraperitoneal administration of the test product and the $DE_{50}$ dose was determined which was the dose at which 50 percent of the animals cannot effect the climb in less than 30 seconds. The results of a and b reported in the following Table.

B. Anticonvulsant Activity a. Electroshock

The anticonvulsant activity of the test products was determined by intraperitoneally administering in increasing doses the products to different groups of mice and one hour after the administration, the mice received an electroshock of 40 volts with a 0.3 second duration with auricular electrodes. Each test used a control group and a test group and the $DE_{50}$ dose in mg/kg was determined which is the dose which protects 50 percent of the animals against electroshock. The results are in the following Table.

b. Pentetrazole

In this test, each compound was intraperitoneally administered in increasing doses to different groups of mice in control and test groups and 30 minutes later, each animal received subcutaneously 150 mg/kg of pentetrazole. A count of the dead mice was taken after 30 minutes and the $DE_{50}$, the dose at which 50 percent of the animals were protected, was determined. The results are reported in the following Table.

TABLE

| | $DE_{50}$ in mg/kg | | | |
|---|---|---|---|---|
| Product of Example | Traction test | Chimney test | Electroshock | Pentetrazole |
| 1 | 70 | 95 | 15 | 15 |
| 2 | 40 | 10 | 10 | 20 |
| 3 | 50 | 50 | 20 | 30 |
| 4 | 100 | 100 | 18 | 35 |
| 5 | 40 | 40 | 18 | 18 |
| 6 | 60 | 20 | 40 | 18 |
| 7 | 50 | 60 | 10 | 21 |
| 8 | 65 | 20 | 20 | 45 |
| 9 | 40 | 40 | 14 | 55 |

The results of the above Table show that the tested products have a good tranquilizing and anticonvulsant activity.

C. Acute Toxicity

The acute toxicity was determined on groups of mice weighing about 20 g to which increasing doses of the products were intraperitoneally administered and the number of dead after 48 hours was determined. The $DL_{50}$ dose for the products of Examples 1 to 8 was on the order of 600 mg/kg and for the product of Example 9 was greater than 800 mg/kg.

Various modification of the products and processes of the invention may be made without departing from the spirit or scope thereof and it is to be understood that the invention is intended to be limited only as defined in the appended claims.

We claim:

1. A compound selected from the group consisting of benzyloxysulfamides of the formula

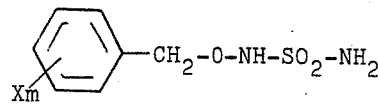

wherein X is a halogen and m is 0, 1, 2 or 3 and their nontoxic, pharmaceutically acceptable alkaline salts.

2. A compound of claim 1 wherein X is selected from the group consisting of fluorine, chlorine and bromine and m is 1.

3. A compound of claim 1 wherein X is chlorine and m is 0 or 2.

4. A compound of claim 1 which is benzyloxysulfamide.

5. A compound of claim 1 which is 2-flourobenzyloxysulfamide.

6. A compound of claim 1 which is 3-fluorobenzyloxysulfamide.

7. A compound of claim 1 which is 4-fluorobenzyloxysulfamide.

8. A compound of claim 1 which is 2-chlorobenzyloxysulfamide.

9. A compound of claim 1 which is 3-chlorobenzyloxysulfamide.

10. A compound of claim 1 which is 4-chlorobenzyloxysulfamide.

11. A compound of claim 1 which is 4-bromobenzyloxysulfamide.

12. A compound of claim 1 which is 2,4-dichlorobenzyloxysulfamide.

* * * * *